Dec. 30, 1969  J. E. ANDERSON  3,487,113
PRODUCTION OF 2-(ETHYLTHIO)ETHANOL
Filed Aug. 31, 1966
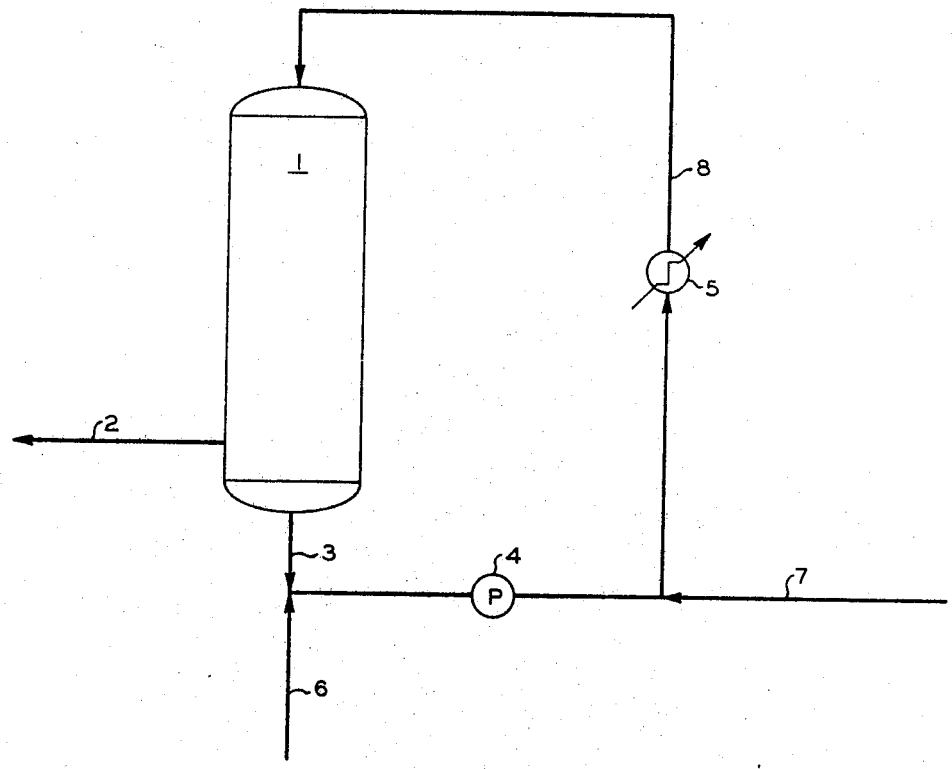
INVENTOR
J. E. ANDERSON
BY Young & Quigg
ATTORNEYS United States Patent Office 3,487,113
Patented Dec. 30, 1969

3,487,113
PRODUCTION OF 2-(ETHYLTHIO)ETHANOL
John E. Anderson, Phillips, Tex., assignor to Phillips Petroleum Company, a corporation of Delaware
Filed Aug. 31, 1966, Ser. No. 576,270
Int. Cl. C07c 149/18
U.S. Cl. 260—609                                5 Claims

ABSTRACT OF THE DISCLOSURE

2(ethylthio)ethanol is prepared by reacting ethylene oxide and ethyl mercaptan in the presence of an amount of reaction mixture sufficient to increase the ethylene oxide and ethyl mercaptan reaction rate.

---

This invention relates to a process for the production of 2-(ethylthio)ethanol.

Heretofore, 2-(ethylthio)ethanol has been prepared by reacting ethylmercaptan with ethylene oxide. This reaction is, in the absence of catalyst, very slow.

Heretofore, in order to increase the rate of reaction, extrinsic catalysts such as ammonium hydroxide have been employed, for example, see U.S. Patent 3,213,144.

It has now been found that 2-(ethylthio)ethanol can be formed at rapid reaction rates and without the use of additional, extrinsic catalysts by carrying out the reaction of ethylene oxide and ethyl mercaptan in the presence of a portion of the reaction mixture formed by reacting ethylene oxide with ethyl mercaptan in the conventional manner.

The 2-(ethylthio)ethanol product of the process of this invention is useful as a solvent for organic materials, as a chemical intermediate for the production of resins, rubbers, plastics, and as an intermediate for systemic insecticides.

Accordingly, an object of this invention is to provide a new and improved process for preparing 2-(ethylthio)ethanol.

Other aspects, objects, and the several advantages of this invention will be apparent to those skilled in the art from the description and appended claims.

FIGURE 1 shows a system embodying this invention.

In FIGURE 1 there is shown a surge tank 1 for storing the whole reaction mixture formed by reacting ethylene oxide and ethyl mercaptan. Reaction mixture is removed from surge tank 1 through line 2 for subsequent separation therefrom of the 2-(ethylthio)ethanol product in a conventional manner such as by fractional distillation.

A portion of the reaction mixture in surge tank 1 is removed through line 3 by pump 4 and passed through heat exchanger 5. Ethyl mercaptan is added to the reaction mixture through line 6 and ethylene oxide is added to the blend of the reaction mixture and ethyl mercaptan by way of line 7.

The mixture of ethylene oxide and ethyl mercaptan in the presence of the reaction mixture undergoes the exothermic reaction of forming 2-(ethylthio)ethanol while passing through heat exchanger 5. Heat exchanger 5 employs a cooling fluid, e.g. 90° F. water, for removing the heat of reaction so that the input to heat exchanger 5 in line 3 and the output of heat exchanger 5 in line 8 are at substantially the same temperature, e.g. about 140° F. Heat exchanger 5 can be any conventional heat exchanger such as a shell-tube type wherein cooling water is employed on the tube side. The ethylene oxide and ethyl mercaptan can be pumped into the interior of line 3 in any conventional manner including the use of conventional mixing eductors.

The whole reaction mixture in line 8 is transferred into surge tank 1 for use in lines 2 or 3 or both.

The precise composition of the whole reaction mixture employed in this invention is not presently completely known but does contain besides the 2-(ethylthio)ethanol product, unreacted ethylene oxide, unreacted ethyl mercaptan, some ethyl sulfides such as diethyl sulfide and diethyl disulfide, and other side reaction products. Generally, the reaction mixture employed in this invention will contain no more than 15 weight percent based on the total weight of the reaction mixture of unreacted ethylene oxide, unreacted ethyl mercaptan, and side reaction products, the remainder of the reaction mixture being substantially all 2-(ethylthio)ethanol.

The amount of reaction mixture employed in the presence of the ethylene oxide and ethyl mercaptan to be reacted can vary widely and generally will be that which will promote, i.e. increase, the rate of reaction of the ethylene oxide and ethyl mercaptan. Generally, a ratio of from about 10:1 to about 2:1 of the reaction mixture to ethyl mercaptan based on volume can be employed.

By following this invention the reaction rate and conversion values to 2-(ethylthio)ethanol will be substantially equivalent to reaction rates and conversions heretofore obtained only by the use of additional, extrinsic catalysts. However, this invention has the advantage in that it obtains its reaction rates and conversions without the use of such extrinsic catalysts and thereby eliminates catalyst preparation, storage, and feeding equipment, reduces corrosion of apparatus that is promoted by some prior art catalysts, and eliminates 2-(ethylthio)ethanol purification problems caused by the presence of some prior art catalysts. Generally, for 90 percent or more weight percent conversions to 2-(ethylthio)ethanol, the reaction time for this invention will be substantially less than two hours, e.g. about one and one-half hours at conventional reaction temperatures, pressures and feed rates.

This invention can be carried out using conventional prior art reaction conditions which can vary widely. Generally, this invention can be practiced using a reaction temperature in the range of from about 100 to about 200, preferably from about 125 to about 200, degrees F. and a reaction pressure of from about 40 to about 100, preferably from about 45 to about 85, p.s.i.g. Usually, a stoichiometric amount of ethylene oxide is employed, i.e. one mole of ethylene oxide per mole of ethyl mercaptan, although as low as 80 percent stoichiometric amount of ethylene oxide can be used. Generally, the mole ratio of ethylene oxide to ethyl mercaptan that can be employed will vary in the range of from about 0.8/1 to about 1.1/1. Any suitable type of cooling means known in the art can be employed to maintain the reaction at the desired temperatures and pressures indicated hereinabove.

EXAMPLE

The process of this invention was carried out using apparatus substantially the same as that disclosed in the drawing. In other words, the process performed in this example comprised removing a portion of the whole reaction mixture of ethylene oxide and ethyl mercaptan from a surge tank, mixing ethyl mercaptan therewith to form a blend, and thereafter mixing ethylene oxide with the resulting blend to form a final mixture. This final mixture was then passed through a shell-tube type heat exchanger using water as the indirect cooling medium so as to maintain the inlet and outlet temperatures of the ethylene oxide, etc. containing liquid substantially the same, i.e. at 140° F.

The operating conditions and results of the process are summarized in the table.

Table

Charge:
- Ethylene oxide, moles per hour _____ 24.02
- Ethyl mercaptan, moles per hour _____ 23.87
- Oxide/mercaptan mole ratio _____ 1.01/1
- Reaction mixture/mercaptan volume ratio __ 5:1

Reaction conditions:
- Reaction time, hours _____ 1½
- Reaction time, °F. _____ 140
- Reaction pressure, p.s.i. _____ 80

Composition of reaction mixture present during the reaction of the ethylene oxide and ethyl mercaptan, weight percent based on the total weight of the reaction mixture:

- Light material _____ 0.3
- Ethylene oxide _____ 0.8
- Ethyl mercaptan _____ 0.4
- Diethyl sulfide _____ 2.6
- Diethyl disulfide _____ Trace
- Unidentified _____ 2.0
- Heavy material _____ 2.4
- 2-(ethylthio)ethanol _____ 91.5

Conventional, non-catalytic, prior art processes reacting ethyl mercaptan and ethylene oxide produced less than 20 percent 2-(ethylthio)ethanol in slightly under four hours. Prior art processes reacting ethyl mercaptan and ethylene oxide using additional, extrinsic catalysts obtained a 90 plus percent conversion to 2-(ethylthio)ethanol in less than two hours. Thus, it can be seen that by the instant invention conversions to 2-(ethylthio)ethanol in the 90 plus range in under two hours of reaction time are obtained but without resort to additional, extrinsic catalysts systems.

Reasonable variations and modifications are possible within the scope of this disclosure without departing from the spirit and scope thereof.

I claim:

1. In a process for preparing 2-(ethylthio)ethanol by reacting ethylene oxide and ethyl mercaptan to produce a reaction mixture, the improvement comprising initially carrying out said reaction in the presence of an amount of reaction mixture sufficient to increase the ethylene oxide and ethyl mercaptan reaction, wherein the volume of reaction mixture used in the presence of the ethylene oxide and ethyl mercaptan to be reacted per volume of ethyl mercaptan is in the range of from about 10:1 to about 2:1 and using an ethylene oxide to ethyl mercaptan mole ratio in the range of from about 0.8/1 to about 1.1/1.

2. The method of claim 1 wherein said reacting of ethylene oxide and ethyl mercaptan is carried out at a temperature in the range of from about 100 to about 200 degrees F. and a pressure in the range of about 40 to about 100 p.s.i.g.

3. The method according to claim 1 wherein said portion of said reaction mixture that is to be present upon initiating and carrying out the reaction of ethylene oxide and ethyl mercaptan has first mixed therewith the ethyl mercaptan to be reacted, thereafter the ethylene oxide to be reacted is mixed with the blend of reaction mixture and ethyl mercaptan and the resulting mixture of ethylene oxide, ethyl mercaptan, and reaction mixture is transferred to a heat exchange zone maintained at the reaction temperature and pressure for the reaction of ethylene oxide and ethyl mercaptan and the ethylene oxide and ethyl mercaptan are allowed to react in the heat exchange zone.

4. The method of claim 1 wherein said reaction mixture contains 2-(ethylthio)ethanol, unreacted ethylene oxide, unreacted ethyl mercaptan, and ethyl sulfides.

5. The method of claim 4 wherein not more than 15 weight percent of the reaction mixture, based on the total weight of the reaction mixture, is composed of said unreacted ethylene oxide, unreacted ethylene mercaptan, and ethyl sulfides.

References Cited

UNITED STATES PATENTS 3,213,144  10/1965  Horning et al. _____ 260—609

OTHER REFERENCES

Zil'berman et al.: "J. Org. Chem. of U.S.S.R.," vol. 2, pp. 238–244.

CHARLES B. PARKER, Primary Examiner

D. R. PHILLIPS, Assistant Examiner